Dec. 14, 1965   J. HENRY-BAUDOT   3,223,870
PRINTED-CIRCUIT WINDING FOR ROTARY ELECTRIC MACHINES
Filed July 27, 1961
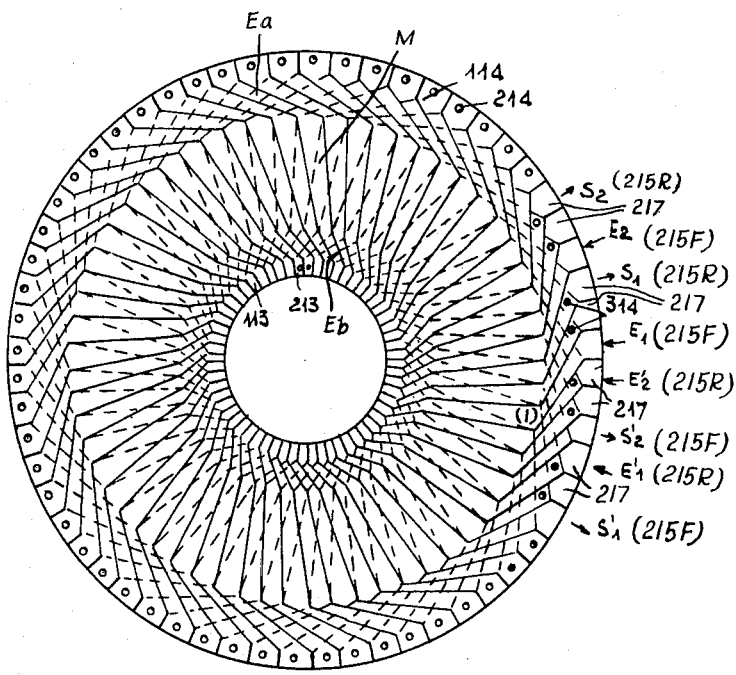

United States Patent Office 3,223,870
Patented Dec. 14, 1965

3,223,870
PRINTED-CIRCUIT WINDING FOR ROTARY ELECTRIC MACHINES
Jacques Henry-Baudot, Antony, France, assignor to Printed Motors Inc., New York, N.Y.
Filed July 27, 1961, Ser. No. 127,260
Claims priority, application France, Sept. 8, 1960, 838,267
2 Claims. (Cl. 310—268)

The present invention concerns improvements in or relating to electric rotary machines embodying printed-circuit disc-shaped windings made of flat conductors distributed in two sets of half-turns on the opposite faces of an insulating annular carrier to which they intimately adhere, said conductors being at least partly connected from face to face by through connections for completing the electrical pattern of the winding prepared by the very shapes of the conductors proper. Such windings may be used as A.C. multiphase windings and the conductors are not interconnected at their ends from the one face to the other one at the locations of the supply terminals for the alternating current.

Such windings may advantageously be of the series-wave pattern but in such a case, and in order to accommodate the openings in the pattern and the division of the annular area, applicant has previously provided in co-pending application Serial No. 780,754, now Patent 2,993,135, to arrange part of the outer connections on a peripherical segment of larger diameter than the maximum diameter of the normal conductor ring on the carrier, and to shift the connections between the tabs serving as supply terminals so that at such places the face-to-face connection ensures an actual shift by one conductor from one face of the winding to the other one. It was then possible to provide a series-wave winding of an even number of turns, hence of half-turn conductors per face but, obviously, the price of this simplification was an increase of the overall diameter of the winding member. Further, this arrangement introduced a certain complication in the printing of the winding as these extensions were to be provided prior to the completion of the winding pattern.

It is the object of the invention to so improve the prior arrangement of shifted connections that such resulting drawbacks are totally avoided. Consequently, when putting the invention into practice, the production of the windings will not be different, until the face-to-face connections are made from the production of other windings of the same overall pattern of printed conductors, which provides an obvious advantage for mass production of such windings to be used either in D.C. or A.C. machines, as rotors or inductors since the windings will not be differentiated until the step of establishing the face-to-face connections and not distinguished when "printing" the conductor patterns on the two faces of the carriers.

According to the present invention, the face-to-face connections are made between the conductor ends which are not interconnected for the supply terminals of the winding, with inward and lateral shifts with respect to the other normal face-to-face connections in the winding.

The invention will be described in detail with reference to an illustrative embodiment thereof shown in the figure of the attached drawings. Said example relates to a ten pole machine and the winding comprises sixty conductors per face, viz. thirty conductors per phase and per face, the machine being a two-phase one. Each phase must constitute a separate open coil, each phase being constituted by two half-phases each one of which is made as a separate and open coil. The connections between phases are made by separate wiring in the machine.

On the drawing, the conductors on one face are delineated by solid lines denoting the gaps between any two contiguous conductors. The gaps between conductors on the rear face are indicated in interrupted lines. Each conductor constitutes one half of a turn of the winding and comprises an intermediate portion M extended at both ends by slanted portions E$a$ and E$b$ up to respective rings of terminal coatings designated at 113 for the inner ring and at 114 for the outer ring. The conductor coatings are obtained from a metallization of an insulating carrier whereupon, for instance, has been applied a photo-etching conventional process well known in the so-called print-circuit techniques.

In such a member, the face-to-face connections shall be obtained by a further and well-known technique consisting of boring holes through metallizations and insulator and metallizing said holes from one face to the other one. Except for the connections which will be herein below defined, the through-face-to-face normal connections are referred to as 213 for the inner ring of terminal coatings 113 and 214 for the outer ring of terminal coatings 114.

On each face of the disc, and in register from one face to the other one, twelve terminal coatings of the ring 114 are left without interconnections. Four of said terminal coatings are referred as 215, the eight other ones as 217. 215 are input and output terminals for the electrical supply. On the front face are the inputs $E_1$, $E_2$ and outputs $S'_1$ and $S'_2$ of two phase halves respectively for the two electrical phases of the winding. On the rear face are the inputs $E'_1$ and $E'_2$ and outputs $S_1$ and $S_2$ of the other phase halves. When the electrical wiring has been completed in the machine, $S_1$ will be connected to $E'_1$ and $S_2$ to $E'_2$; these external connections are not shown on the drawing.

Metallized hole interconnections 314 are made with a radial and inwards shift with respect to the terminal coatings 215–217, by pairs, from one face to the other one. Under the terminal coatings 215 of one face are present terminal coatings 217 on the outer face and conversely, for the four coatings 215 of a face, the remaining coatings 217 registering from one face to the other one. The lateral shift is such, with respect to the radial shift, that the thus connected conductors advance by an additional one from one face to the other one in the normal sequence of the conductors on the annulus covered by the winding, at such shifted interconnection places.

For explaining the pattern of the winding which is obtained according to the example shown in the drawing, one will assume that the conductors on the front face are numbered from 1 to 119 from the conductor connected to input $E_1$, in an anti-clockwise direction, said conductors being only numbered in odd numbers; similarly the conductors on the rear face are assumed to be numbered, in even numbers, from 2 to 120 in the same direction of rotation. The conductor No. 2 is "under" the conductor No. 1, and so forth, in that the outer ends of the mid-portions M of conductors 1 and 2 coincide, said mid-portions being shown slanted in opposite directions on the drawing. However such slanting is not imperative for all windings according to the invention.

In tracing the conductor connections for the different phase windings, it should be noted that the inner and outer terminal coatings for each conductor are displaced with respect to the intermediate portion M of the conductor. For example, intermediate portion M for conductor 1 on the front face of the disc is connected to the terminal coating 215 which forms the input terminal $E_1$, and this terminal coating, due to the slanting of the end portion E$a$ of conductor 1, is displaced in a counter-clockwise direction from the outer end of the mid portion M of conductor 1 by three terminal portion spacings. Also, as shown in dotted lines in the drawing, the slanted end portions of the conductors on the rear face of the disc results in the outer terminal coatings for the respective conductors being displaced three spaces from the intermediate section in a clockwise direction. For example, the outer end of the mid section M of conductor 2 is located immediately below the outer end of the mid portion M of conductor 1, as explained above, and the outer terminal coating for conductor 2 is located beneath the terminal coating 215 which forms the output terminal located beneath the terminal coating 215 on the front face of the disc and which forms the output terminal $S'_1$. Thus the outer terminal coatings for conductors 1 and 2 are spaced apart by six terminal coating spacings.

The phase half starting from $E_1$ on the front face and ending at $S_1$ on the rear face may consequently be followed: from $E_1$ through conductor No. 1 in the clockwise direction to conductors Nos. 110, 97, . . ., 14 wherefrom a shortened connection is made through a face-to-face connection 314 to the second turn on the winding by conductor No. 3, and then conductors 112, 99, . . ., 16 where a shortened face-to-face connection 314 leads to conductor No. 5 starting a further turn, through conductors Nos. 114, 101, . . . 18, output $S_1$ of said phase half. The other half of the first phase from $E'_1$ to $S'_1$ starts from $E'_1$ through rear conductor No. 6 and advances in a counterclockwise direction through conductors Nos. 17, 30, . . ., 113 where a shortened face-to-face connection 314 leads to conductor No. 4 wherefrom starts the second turn through conductors Nos. 15, 28, . . ., 111 where a second shortened connection 314 leads to conductor No. 2 and the third turn passes through the conductors Nos. 13, 26, . . ., 109 to the output $S'_1$.

The second phase may similarly be traced: for the first phase half, from $E_2$ to $S_2$ through conductors Nos. 7, 116, 103, . . ., 20, 9, 118, 105, . . ., 22, 11, 120, 107, . . ., 24 to $S_2$; for the second phase half from $E'_2$ to $S'_2$ through conductors Nos. 12, 23, 36, . . ., 10, 21, 34, . . ., 8, 19, 32, . . ., 115 to output $S'_2$.

Any other condition of number of poles and electrical phases, and also number of conductors per pole and phase may be constructed in a similar fashion according to the invention, each phase comprising two phase halves advancing in relatively opposite directions over the winding ring, with steps excluding one conductor from one face to the other one at each turn, viz. with a number of such steps equal to the number of conductors per phase minus one.

What is claimed is:

1. An alternating current inductor winding for an axial airgap electric rotary machine, comprising two sets of half-turn conductors intimately adhering to annular insulating areas on opposite faces of an annular carrier, the conductors of each set being uniformly distributed about said annular areas and terminating at the outer boundary of the annular areas in terminal portions located at equal distances from the center of the carrier, the terminal portions of the two sets of conductors being arranged in registering pairs on opposite faces of said carrier, the conductors of the two sets having inclined portions adjacent said terminal portions, said inclined portions being inclined in opposite directions, whereby the inclined portions of one set of conductors cross inclined portions of the other set, a first set of face-to-face connections establishing separate connections between the terminal portions of each registering pair of terminal portions for all pairs of terminal portions covering a major angular sector of said carrier, the remaining pairs of terminal portions within the minor angular sector being free of face-to-face connections and a second set of face-to-face connections located within said minor angular sector and connecting together registering crossing portions of conductor pairs, said second set of face-to-face connections being located radially inward from the terminal portions of said conductors, the face-to-face connections of said second set being spaced apart to skip a conductor at certain locations, thereby omitting the face-to-face connections for certain conductors to which supply leads may be connected.

2. An inductor winding acording to claim 1, wherein the winding pattern is of the series-wave type and comprises an even number of turns.

References Cited by the Examiner

UNITED STATES PATENTS

| | | | |
|---|---|---|---|
| 2,970,238 | 1/1961 | Swiggett | 310—268 |
| 2,993,135 | 7/1961 | Henry-Baudot | 310—180 |
| 3,023,334 | 2/1962 | Burr et al. | 310—268 |
| 3,095,516 | 8/1963 | Moressee et al. | 310—268 |

MILTON O. HIRSHFIELD, *Primary Examiner.*

DAVID X. SLINEY, *Examiner.*